United States Patent [19]

Sakurai

[11] Patent Number: 5,963,655
[45] Date of Patent: *Oct. 5, 1999

[54] SYSTEM FOR STORING AND OUTPUTTING FIGURE DATA

[75] Inventor: Masakatsu Sakurai, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/495,023

[22] Filed: Jun. 27, 1995

[30] Foreign Application Priority Data

Jun. 30, 1994 [JP] Japan .................................. 6-149420

[51] Int. Cl.⁶ .................................................. G06K 9/00
[52] U.S. Cl. .......................... 382/113; 382/194; 382/305; 395/851; 711/113
[58] Field of Search ....................... 382/193, 194, 382/201, 203, 113; 395/130, 140, 141, 147, 150, 167, 168, 169, 170, 851, 853; 711/113

[56] References Cited

U.S. PATENT DOCUMENTS

| | | | |
|---|---|---|---|
| 5,073,956 | 12/1991 | Kawamoto et al. | 382/256 |
| 5,121,442 | 6/1992 | Togawa et al. | 382/189 |
| 5,301,267 | 4/1994 | Hassett et al. | 395/169 |
| 5,309,554 | 5/1994 | Ito | 395/169 |
| 5,410,647 | 4/1995 | Peaslee et al. | 395/167 |
| 5,469,513 | 11/1995 | Kurumida | 382/203 |
| 5,495,560 | 2/1996 | Kumada | 395/114 |
| 5,544,265 | 8/1996 | Bozinovic et al. | 382/203 |
| 5,572,605 | 11/1996 | Toraichi | 382/241 |
| 5,579,416 | 11/1996 | Shibuya et al. | 395/167 |
| 5,589,851 | 12/1996 | Valdes et al. | 345/136 |

*Primary Examiner*—Jon Chang
*Assistant Examiner*—Jayanti K. Patel
*Attorney, Agent, or Firm*—Fitzpatrick, Cella, Harper & Scinto

[57] ABSTRACT

A figure, including characters, is developed into a plurality of figure patterns of figure shapes, and the plurality of developed figure patterns are registered, and a figure is drawn based on the selected registered figure pattern. Thereby it is possible to process not only a character but also a figure pattern by using a cache memory efficiently. As a result, high speed drawing can be performed.

35 Claims, 13 Drawing Sheets

INPUT FIGURE

STRAIGHT LINE APPROXIMATED FIGURE

SCAN LINE FIGURE

PIXEL PATTERN FIGURE

FIG. 3

FIGURE STORAGE FORM

| POINTER TO NEXT FIGURE |
| --- |
| DATA SIZE |
| FIGURE TYPE |
| FIGURE IDENTIFICATION INFORMATION |
| FIGURE STORAGE FORM INFORMATION |
| OFFSET POSITION |
| FIGURE PATTERN INFORMATION |

FIG. 4A

STRAIGHT LINE APPROXIMATION POINT GROUP FORM

| POINTER TO NEXT FIGURE |
|---|
| DATA SIZE |
| 1 (CIRCLE) |
| 9 (RADIUS) |
| 1 (STRAIGHT LINE APPROXIMATION POINT GROUP) |
| (-9, -9) |
| 16 (COUNT) |
| ( 9.5 , 0.5) |
| (12.9 , 1.2) |
| (15.9 , 3.1) |
| (17.8 , 6.1) |
| (18.5 , 9.5) |
| (17.8 , 12.9) |
| (15.9 , 15.9) |
| (12.9 , 17.8) |
| ( 9.5 , 19.0) |
| ( 6.1 , 17.8) |
| ( 3.1 , 15.9) |
| ( 1.2 , 12.9) |
| ( 0.5 , 9.5) |
| ( 1.2 , 6.1) |
| ( 3.1 , 3.1) |
| ( 6.1 , 1.2) |

FIG. 4B

SCAN LINE FORM

| POINTER TO NEXT FIGURE |
|---|
| DATA SIZE |
| 1 (CIRCLE) |
| 9 (RADIUS) |
| 2 (SCAN LINE) |
| (-9, -9) |
| 19 (COUNT) |
| 0 , 6 , 12 |
| 1 , 4 , 14 |
| 2 , 3 , 15 |
| 3 , 2 , 16 |
| 4 , 1 , 17 |
| 5 , 1 , 17 |
| 6 , 0 , 18 |
| 7 , 0 , 18 |
| 8 , 0 , 18 |
| 9 , 0 , 18 |
| 10 , 0 , 18 |
| 11 , 0 , 18 |
| 12 , 0 , 18 |
| 13 , 1 , 17 |
| 14 , 1 , 17 |
| 15 , 2 , 16 |
| 16 , 3 , 15 |
| 17 , 4 , 14 |
| 18 , 6 , 12 |

FIG. 4C

PIXEL PATTERN FORM

| POINTER TO NEXT FIGURE |
|---|
| DATA SIZE |
| 1 (CIRCLE) |
| 9 (RADIUS) |
| 3 (PIXEL PATTERN) |
| (-9, -9) |
| 19 (NUMBER OF PIXEL WIDTH) |
| 19 (NUMBER OF PIXEL HEIGHT) |
| 57 (NUMBER OF DATA BYTE) |
| 0000001111111111000000- |
| 0000011111111111110000- |
| 0000111111111111111000- |
| 0001111111111111111100- |
| 0011111111111111111110- |
| 0111111111111111111110- |
| 0111111111111111111111- |
| 1111111111111111111111- |
| 1111111111111111111111- |
| 1111111111111111111111- |
| 1111111111111111111111- |
| 1111111111111111111111- |
| 1111111111111111111111- |
| 0111111111111111111111- |
| 0111111111111111111110- |
| 0011111111111111111110- |
| 0001111111111111111100- |
| 0000111111111111111000- |
| 0000011111111111110000- |
| 0000001111111111000000- |

SYSTEM FOR STORING AND OUTPUTTING FIGURE DATA

BACKGROUND OF THE INVENTION

The present invention relates to an image processing method and apparatus and, more particularly, to an image processing method and apparatus which draw figures in accordance with instructions from data source.

In a conventional printing device which outputs figures, the following process is performed by using a cache memory. First, bitmap information of character patterns which has been generated is stored along with character sizes, character codes, and the like, and, when a character pattern of an arbitrary size is to be generated from outline character data, the stored bitmap information is searched whether or not there is bitmap information of the character pattern to be generated. If there is, the searched bitmap information is used. This process is used to prevent the disadvantage, as much as possible, in which drawing characters based on outline character data requires a much longer time than the drawing of characters based on bitmap patterns whose sizes are fixed in advance.

In the aforesaid conventional method, process using a cache memory, as described above, is not performed other than to form characters. The reason for this is that figures use the same patterns less often than characters, and have variety of pattern sizes. Therefore, process for forming figures by using a cache memory would be very complicated comparing to process for generating characters, thus an apparent advantage, such as to shorten processing time remarkably, can not be expected. Contrary to character generation, large capacity of memory would be necessary for storing figure patterns, and it would take considerable time to search all the stored figure patterns in the memory. Thus, above disadvantages of processing figures by using a cache memory exist.

Regarding generating characters, the aforesaid process using a cache memory is employed only to characters of small size. This is because frequency of using characters of large size is less often than that of small size, and in addition, the capacity required for storing character pattern increases in proportion to square of character size. Accordingly, disadvantages to generate large characters by using a cache memory exist as in the case of forming figures.

SUMMARY OF THE INVENTION

The present invention has been made in consideration of the above situation, and has as its object to provide an image processing method and apparatus capable of forming patterns not only of characters but also of figures by using a cache memory efficiently, thereby performing high speed drawing.

According to the present invention, the foregoing object is attained by providing an image processing apparatus comprising: developing means for developing a figure, including characters, into a plurality of figure patterns of figure shapes; registration means for registering the plurality of figure patterns developed by the developing means; and drawing means for selecting figure patterns registered by the registration means and for drawing a figure.

According to the aforesaid configuration, a figure, including characters, is developed to plural kinds of patterns of figure shapes, and the plural kinds of developed patterns are stored. Further, when the figure is to be drawn, the registered patterns are selected out of a plurality of stored figure patterns. Accordingly, it is possible to efficiently form patterns not only of characters but also of figures by using a cache memory, thereby performing high speed formation of figures.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing data structure of a figure storage form according to the first embodiment;

FIGS. 4A to 4C are examples of data structures of figure storage forms;

DETAILED DESCRIPTION OF THE PREFERRED EMBODIMENTS

Preferred embodiment of the present invention will be described in detail in accordance with the accompanying drawings.

First Embodiment

In the following embodiment, a case where the present invention is applied to a figure drawing process performed by a printing device, such as a laser beam printer and an ink jet printer, which outputs binary data, namely outputs black and white, is explained. However, the present invention is not limited to the above case, and can be also applied to a printing device which performs multi-value printing or color printing. Further, it is possible to apply the present invention to a controller of a display device, such as a CRT display and a liquid crystal display.

Figure 1:
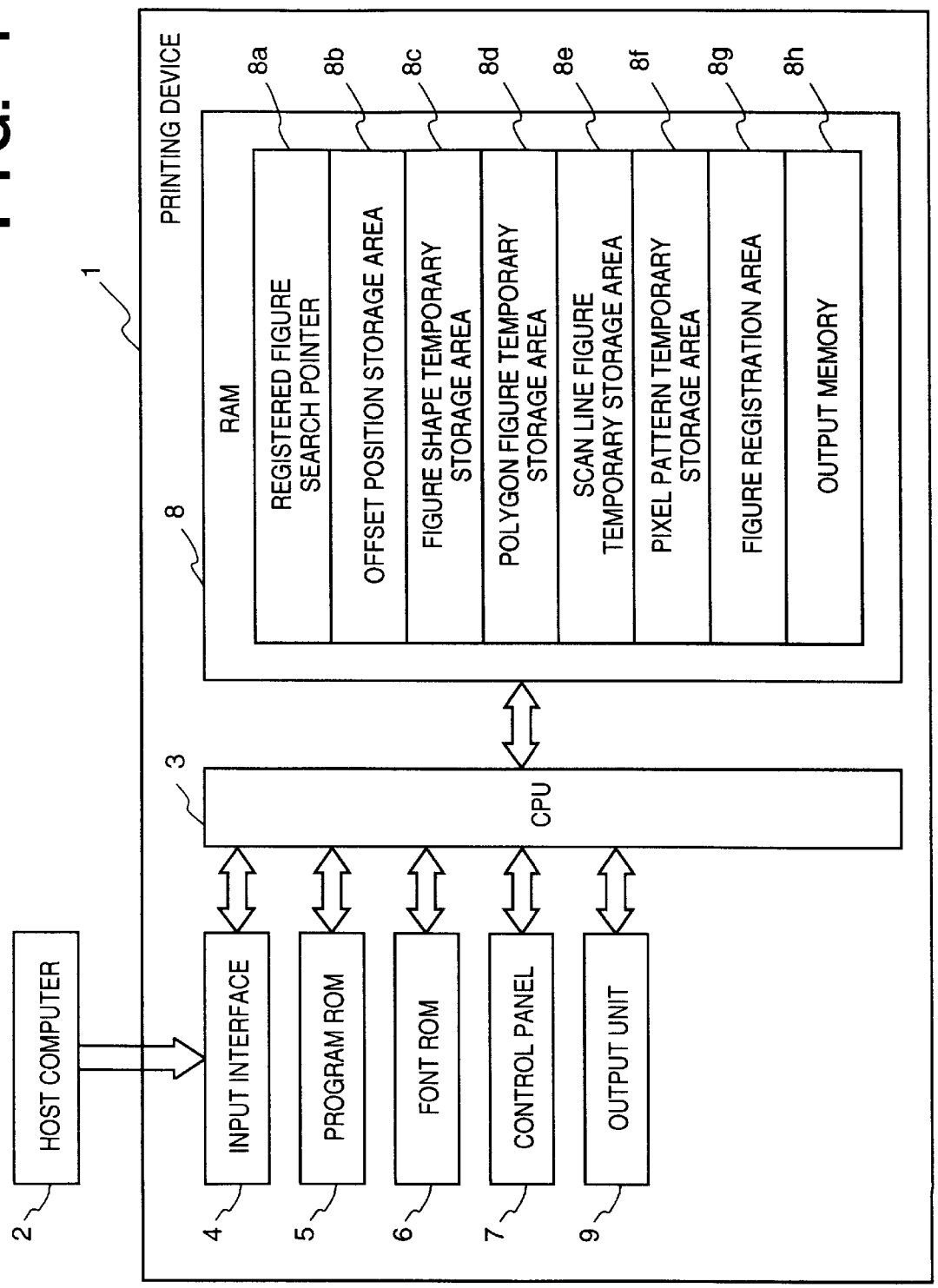
FIG. 1 is a block diagram showing a brief configuration of a printing device according to a first embodiment.

FIG. 1 is a block diagram showing a brief configuration of a printing device in the first embodiment. In FIG. 1, reference numeral 1 denotes a main body of the printing device; 2, a host computer which can be a data source; 3, CPU which controls the entire operation of the printing device 1; 4, an input interface which includes a buffer for storing data sent from the host computer 2; 5, program ROM which stores programs responsible for operations shown in flowcharts in FIGS. 5 to 11 and programs for controlling the whole printing device 11; 6, font ROM which stores character patterns corresponding to character codes inputted from the input interface 4; and 7, a control panel from which various kinds of setting of the printing device are performed.

Further, reference numeral 8 denotes RAM in which tables, a work area used when the CPU 3 executes various kinds of programs, and the like are defined. The RAM 8 includes a registered figure search pointer 8a to be used as a pointer when searching registered figures, an offset position storage area 8b for storing an offset position with respect to a reference position in a figure, a figure shape temporary storage area 8c for temporary storing a shape of a figure indicated by a data source, a polygon figure temporary storage area 8d for temporary storing the figure shape as point group information, a scan line (raster scan line) figure temporary storage area 8e for temporary storing the figure shape as scan line information, a pixel pattern temporary storage area 8f for temporary storing the figure shape as pixel pattern information, a figure registration area 8g for storing registered figures, and an output memory 8h for storing image patterns to be outputted. Reference numeral 9 is an output unit for printing page data stored in the output memory 8h.

Figure 2A:
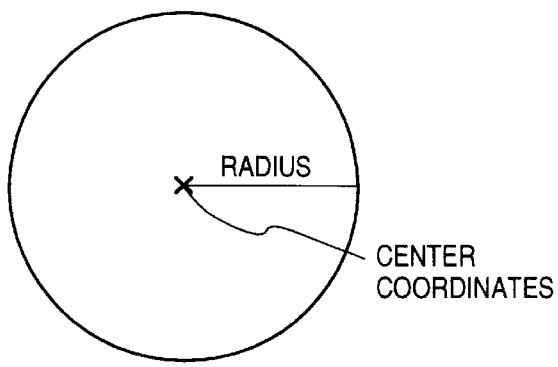
FIGS. 2A to 2D are diagrams illustrating a method of storing figure information of each figure storage form according to the first embodiment.
Figure 2B:
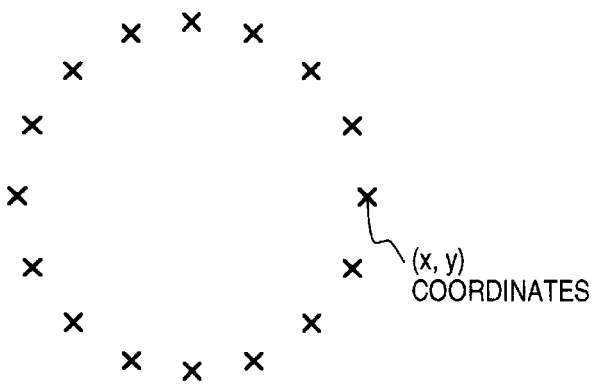
Figure 2C:
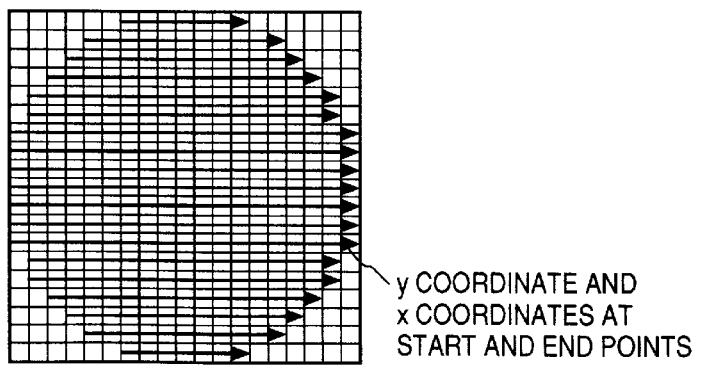
Figure 2D:
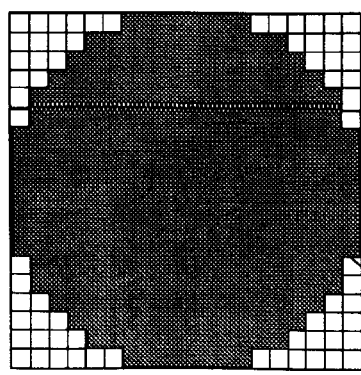
Figure 5:
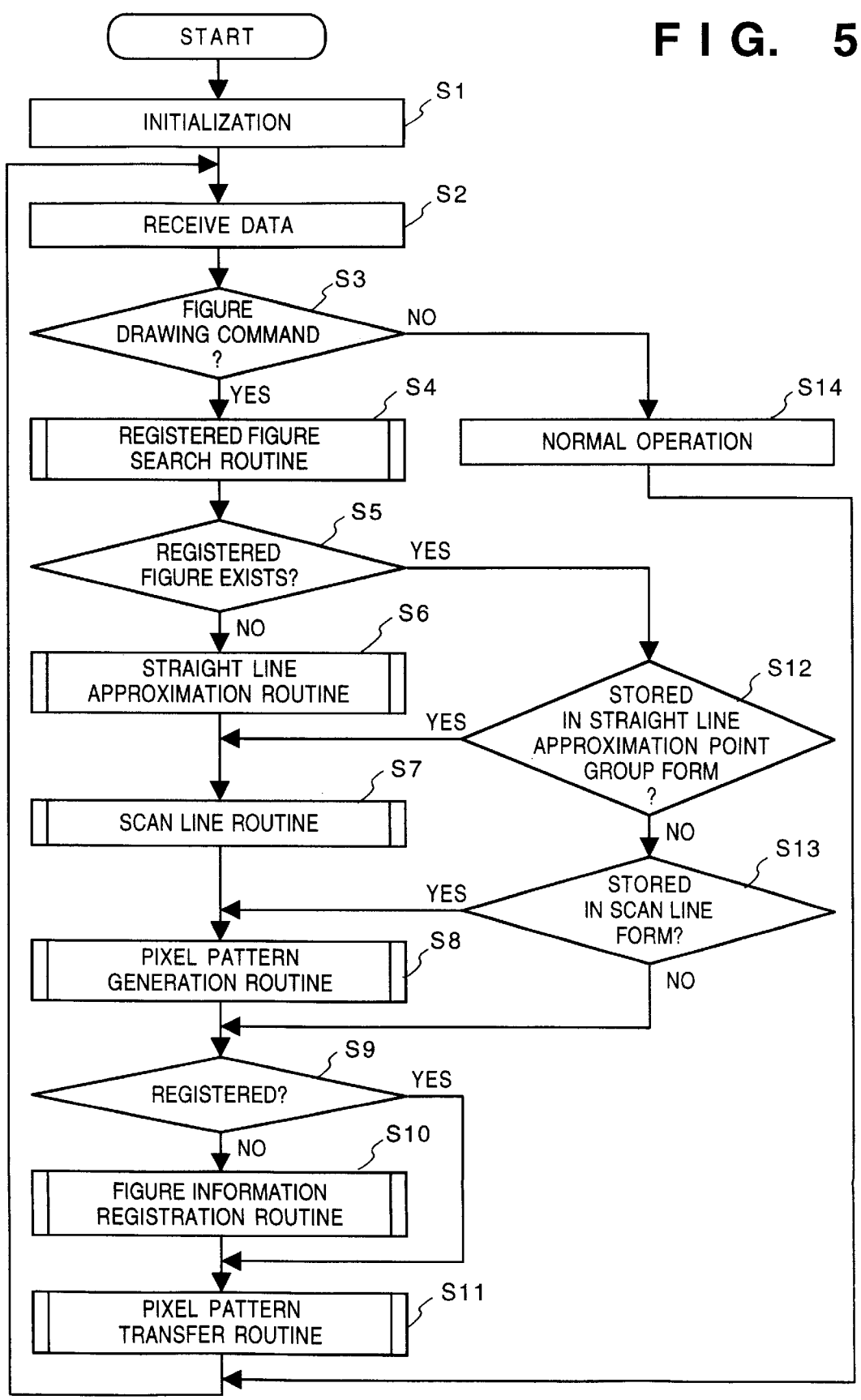
FIG. 5 is a flowchart showing an operational sequence according to the first embodiment.
Figure 6:
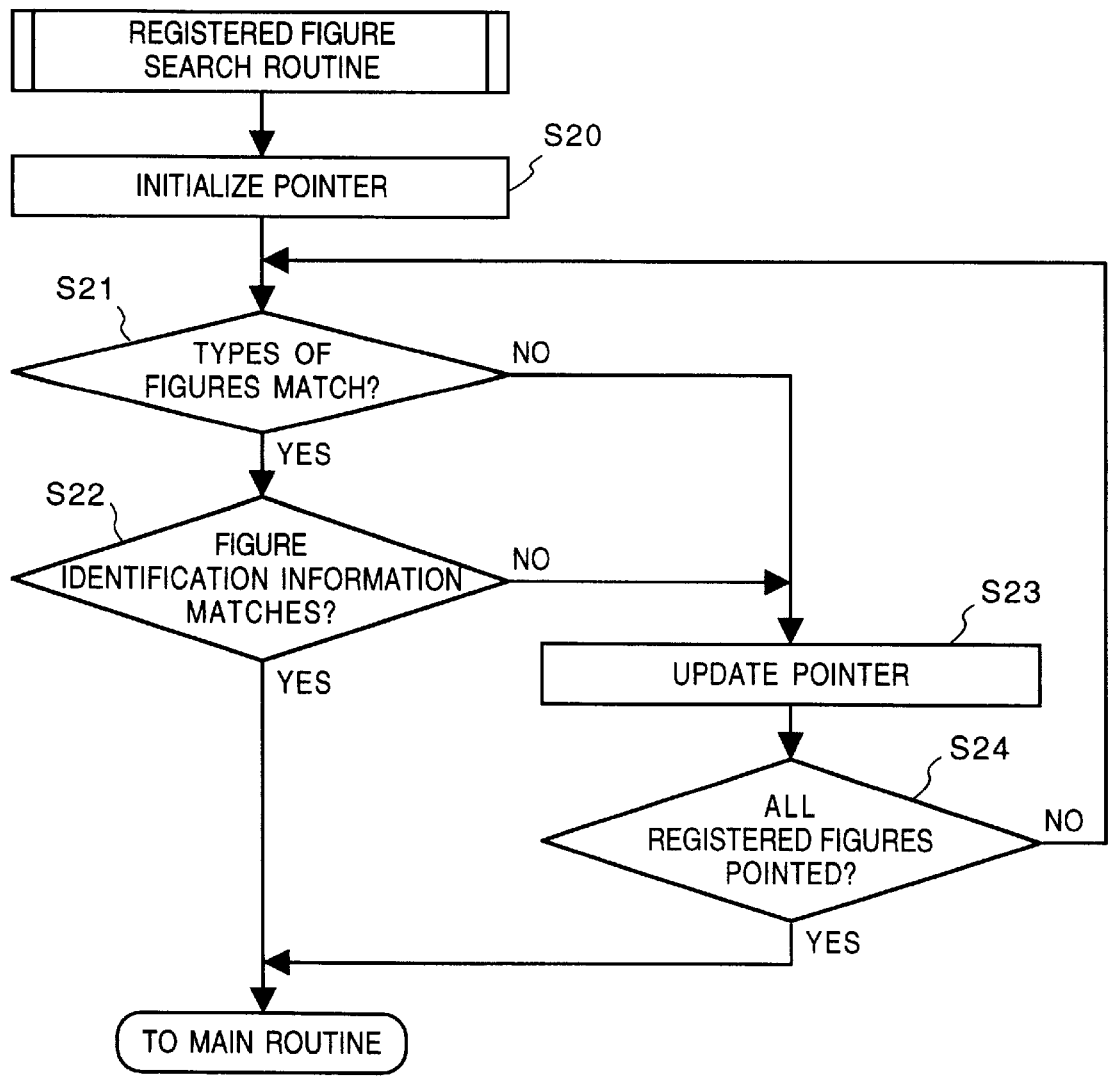
FIG. 6 is a flowchart of a registered figure search process in FIG. 5.

FIGS. 2A to 2D are diagrams illustrating a method of storing figure information of each figure storage form, more specifically, showing states in which a circle is stored. FIG. 2A shows a circle whose center coordinate and radius are given by an input state. FIG. 2B shows a state of point group after the input circle is applied with a straight line approximation. Each point of the point group is expressed by (x, y) coordinates. FIG. 2C shows a state in which the point group, applied with the straight line approximation, is further converted to scan line components. Each scan line component is expressed by combinations of a value of y coordinate at the start point and values of x coordinate at the start and end points. Further, FIG. 2D shows a state in which the horizontal components which are converted from the point group, obtained by processing the input circle with the straight line approximation, are changed to a pixel pattern.

FIG. 3 is a diagram showing a data structure which is to be a base of figure storage forms. As shown in FIG. 3, the data is constructed with a pointer 31 which points to the next figure for linking a plurality of figures stored in this figure storage form, a data size 32 in this figure storage form, a figure type 33 for showing the type of the figure, figure identification information 34 used for identifying the figure based on the size and shape of the figure, figure storage form information 35 for showing in which form the figure is stored, an offset position of the FIG. 36, and figure pattern information 37 whose contents are based on the figure storage form information 35. Note that NULL in the pointer 31 to the next figure indicates the end of the link.

FIGS. 4A to 4C are examples of data structures of figure storage forms shown in FIG. 3, and correspond to the storage of data based on figures shown in FIGS. 2A to 2D. Note that FIGS. 4A to 4C show examples in which the figure to be stored is a circle whose radius is nine dots, however, the data structures are not limited to the size of radius or a circle. For example, the data structures in FIGS. 4A to 4C can be applied to such figures as quadrilaterals and ellipses.

First, FIG. 4A is a data structure in which figure data is stored in a form of straight line approximation point group. As shown in FIG. 4A, the data structure consists of a pointer to the next figure for linking this figure data to other stored figure data, a data size of this figure data, a value "1" as the figure type indicating a circle, a value "9" as the figure identification information indicating a size of the circle by radius size, a value "1" as the figure storage form information indicating the straight line approximation point group, coordinates "(−9, −9)" as the offset position for aligning a position used when the stored figure data is drawn in the output memory 8h, the number of the points "16" in the point group as the figure pattern information when the data is in the straight line approximation form, and coordinates of the points in the point group, "(9.5, 0.5)",~"(6.1, 1.2)".

FIG. 4B is a data structure in which figure data is stored in a scan line form. As shown in FIG. 4B, the data structure consists of a pointer to the next figure for linking this figure data to other stored figure data, a data size of this figure data, a value "1" as the figure type indicating a circle, a value "9" as the figure identification information indicating a size of the circle by radius size, a value "2" as the figure storage form information indicating the scan line form, coordinates "(−9, −9)" as the offset position for aligning a position used when the stored figure data is drawn in the output memory 8h, the number of the scan lines "19" as the figure pattern information when the data is in the scan line form, and coordinates "(0, 6, 12)"~"(18, 6, 12)", showing y coordinate and x coordinate at the start and the end points, respectively, as data of each scan line.

FIG. 4C is a data structure in which figure data is stored in the pixel pattern form. As shown in FIG. 4C, the data structure consists of a pointer to the next figure for linking this figure data to other stored figure data, a data size of this figure data, a value "1" as the figure type indicating a circle, a value "9" as the figure identification information indicating a size of the circle by radius size, a value "3" as the figure storage form information indicating the pixel pattern form, coordinates "(−9, −9)" as the offset position for aligning a position used when the stored figure data is drawn in the output memory 8h, the number of the pixel width "19" and another number of pixel height "19" as the figure pattern information when the data is in the pixel pattern form, the number of data byte "57" of the pixel pattern, and pixel pattern data of this number of data byte.

Next, an operation of the aforesaid configuration in the first embodiment will be explained with reference to flowcharts in FIGS. 5 to 11.

First, when the printing device 1 is powered on, the process proceeds to step S1 where the printing device is initialized, the figure registration area 8g in the RAM 8 is cleared so that no figure data is registered there, and the output memory 8h is cleared. Then at step S2, data is received from the input interface 4, and at step S3, whether or not the received data is a figure drawing command data is determined. If it is, the shape of the figure designated by the command is set in the figure shape temporary storage area 8c. Then at step S4, whether or not the figure designated by the figure drawing command data has been registered is determined by calling a registered figure search routine shown in a flowchart in FIG. 6.

In the registered figure search routine, the registered figure search pointer 8a is initialized so that it points to figure data registered in the figure registration area 8g. Next at step S21, it is determined whether or not the type of the figure, e.g., a circle, a quadrilateral, a line, or a polygon, set in the figure shape temporary storage area 8c matches the type of the registered figure addressed by the pointer 8a. If the type of the figure match, the process proceeds to step S22 in which it is determined whether or not the figure identification information, e.g., the figure size and the coordinate position, set in the figure shape temporary storage area 8c matches that of the registered figure addressed by the pointer 8a. If the figure identification information of the figures matches, the process goes back to the main routine shown in FIG. 5.

If the figure type or the figure identification information does not match at step S21 or at step S22, respectively, the process moves to step S23 where the pointer 8a is updated so as to point the next registered figure. Next at step S24, whether or not the pointer 8a has addressed all the registered figures, namely whether or not the content addressed by the pointer 8a is NULL, is determined. If it is not NULL, namely all the registered figures have not been addressed by the pointer 8a, the process goes back to step S21, whereas if it is, namely all the registered figures have been addressed, the process goes back to the main routine shown in FIG. 5.

Returned from the registered figure search routine called at step S4, at step S5, whether or not there is a registered figure is determined by checking whether or not the content addressed by the pointer 8a is NULL. If it is not, the process calls a straight line approximation routine shown in a flowchart in FIG. 7.

In the straight line approximation routine, first at step S30, the type of figure set in the figure shape temporary storage area 8c is determined. This process is for performing subsequent straight line approximation process by using equations suitable for each type of figure. Next at step S31, an offset position of the figure is calculated and stored in the offset position storage area 8b. The calculation of the offset position differs depending on shapes of the figures. However, basically, the smallest quadrilateral capable of including the figure is found first, then the position of the right upper end of the quadrilateral from a reference position of the figure, e.g., the center of the circle, is found as the offset position. As an example, the circle having radius of "9", shown in FIG. 4A, the offset position is −9 in the horizontal direction and −9 in the vertical direction.

Next at step S32, the straight line approximation process which is suitable to the figure determined at step S30 is performed. There are various methods for performing the straight line approximation process depending on the type of figure. For a circle, number of division for the straight line approximation is decided in advance, coordinates of the points in the point group on the circumference are obtained per angle which is obtained by dividing 360 degree by the decided division number. FIG. 4A shows an example in which a circle is divided by 16. It should be noted that the method of the straight line approximation is not limited to above, and, regarding a figure given by quadratic or cubic functions, other straight line approximation method which is suitable for characteristics of the functions can be employed. Further, in a case where a figure or a part of a figure is expressed with straight lines, the figure or the part of the figure does not have to be applied with the straight line approximation process. Then at step S33, point group data obtained after the straight line approximation process is applied is stored in the point group figure temporary storage area 8d along with the number of points, and the process goes back to the main routine.

Figure 8:
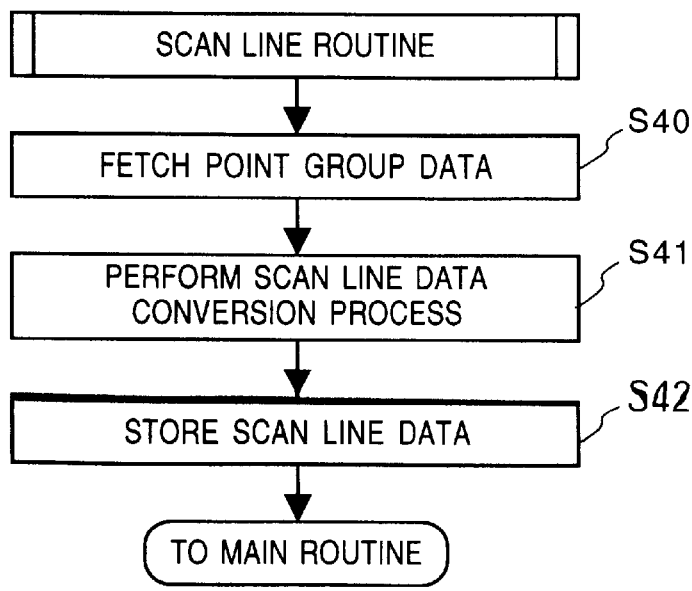
FIG. 8 is a flowchart of a scan line in FIG. 5.

Returned from the straight line approximation routine which is called at step S6, the process proceeds to step S7 where a scan line routine shown in a flowchart in FIG. 8 is called.

In the scan line routine, at step S40 in FIG. 8, the point group data set in the point group figure temporary storage area 8d is fetched and applied with a scan line data conversion process at step S41. In the scan line data conversion process, the adjacent x and y coordinate points, determined by the straight line approximation process are joined by straight lines to form an approximate figure represented by the input data. The approximate figure is divided by multiple scan lines and the coordinates where the scan lines intersects the straight lines forming the approximate figure are determined. For each scan line (y coordinate is constant), corresponding two x coordinates (one at each intersecting point) are determined. Then at step S42, the obtained y coordinate value and the pair of right and left x coordinate values are sorted in the increasing order of the y coordinate values. The y and the two x coordinate values are stored in the scan line figure temporary storage area 8e along with the number of triplets, and the process moves back to the main routine. Note that the y coordinate value and the right and left x coordinate values are used as the scan line information in the first embodiment, however, the present invention is not limited to this, and the scan line process can be in a run length form or in other value storage form. Further, instead of using scan lines, vertical lines, obtained by interchanging x and y coordinates, can be used as a vertical line process.

Figure 9:
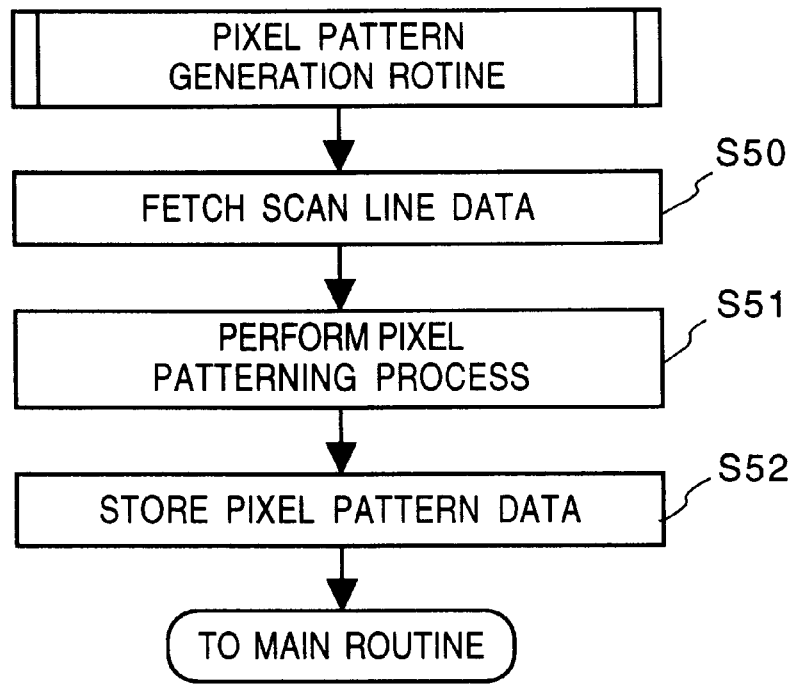
FIG. 9 is a flowchart of a pixel pattern generation process in FIG. 5.

After the process returns from the scan line routine called at step S7, at step S8, a pixel pattern generation routine shown in a flowchart in FIG. 9 is called.

In the pixel pattern generation routine, first at step S50, the scan line data set in the scan line figure temporary storage area 8e is fetched, and applied with a pixel patterning process at step S51. In this process, bits between the right and left x coordinates for each y coordinate are turned on. Then at step 52, a pattern obtained after processing the bits is stored in the pixel pattern temporary storage area 8f, and the process goes back to the main routine. It should be noted that the pixel pattern generation in this embodiment is performed by bit, since each pixel is assigned either as black or white, namely a binary value. However, when a pixel is assigned with a multi-value, a write process is to be performed by predetermined number of bits assigned for a single pixel. Further, for a color image, the write process is performed in a memory corresponding to three colors of YMC (yellow, magenta, and cyan), four colors of YMCK (yellow, magenta, cyan, and black), or three colors of RGB (red, green, and blue) in an output device.

Figure 10:
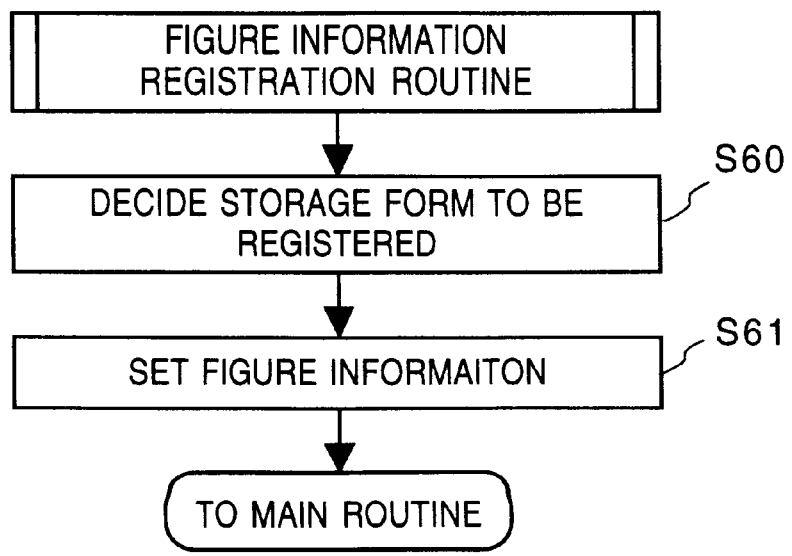
FIG. 10 is a flowchart of a figure information registration process in FIG. 5.

After the process returns from the pixel pattern generation routine called at step S8, the process proceeds to step S9 where whether or not the figure has already been registered or not is determined by checking whether or not the content addressed by the registered figure search pointer 8a is NULL. If it is determined that the figure has been registered, the process moves to step S11 which will be explained later. Whereas, if it is determined that the figure has not been registered, a figure information registration routine shown in a flowchart in FIG. 10 is called at step S10.

In the figure information registration routine, first at step S60, data sizes of the figure data stored in the point group figure temporary storage area 8d, the scan line figure temporary storage area 8e, and the pixel pattern temporary storage area 8f are compared to each other, and storage form having the smallest data size is to be registered. Note that the storage form is based on its data size in this embodiment, however, it can be also based on a size of a figure, or the states of available memory space. At step S61, the figure data is registered in the figure registration area 8g in the storage form decided at step S60. More specifically, a pointer for linking to the figure data which has been registered is set, and the data size of the registered data, the figure type, the figure identification information, the figure storage form information, the offset position, and the figure pattern information in accordance with the decided figure storage form are also set.

Figure 11:
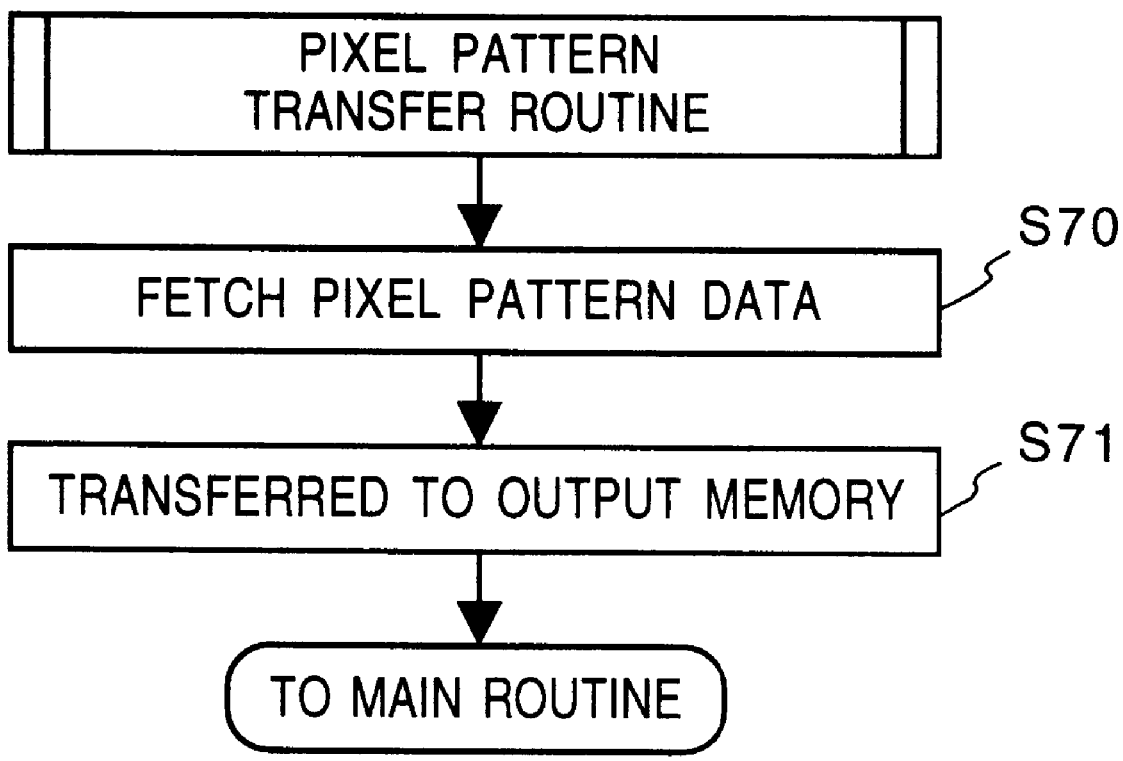
FIG. 11 is a flowchart of a pixel pattern transfer process in FIG. 5.

After the process returns from the figure information registration routine called at step S10, a pixel pattern transfer routine shown in a flowchart in FIG. 11 is called at step S11. In the pixel pattern transfer routine, first at step S70, pixel pattern data is fetched. If the pixel pattern data is stored in the figure registration area 8g, it is fetched from the area 8g, and if it is stored in the pixel pattern temporary storage area 8f, then it is fetched from the area 8f. Then at step S71, the fetched pixel pattern is transferred to a drawing position in the output memory 8h, and the process moves back to the main routine. In this transference, the pixel pattern is transferred to a position decided in consideration with the reference position and the offset position of the figure, and, if any extra process, such as gray scale patterning, hatching, and coloring, is to be applied, it is performed during this transference. Further, the pixel pattern to be drawn to the output memory 8h can be processed with additional logical operations during this transference.

After the process returns from the pixel pattern transfer routine called at step S11, it goes back to step S2.

In contrast, if it is determined at step S5 that there is a registered figure, the process moves to step S12 where whether or not the storage form of the registered figure is in the straight line approximation point group form is determined on the basis of the figure storage form information. If yes at this step, the process goes to step S7 where the aforesaid scan line routine is called, whereas if no, the process moves to step S13. At step S13, whether or not the storage form of the registered figure is in the scan line form is determined on the basis of the figure storage form information. If it is, the process moves to step S8, whereas if it is not, the process moves to step S9.

Further, in the decision step S3, if the received data is determined that it is not a figure drawing command data, the process proceeds to step S14 where a normal operation as a printing device is performed, then goes back to step S2. More specifically, if the received data is a character printing command, then characters of designated character codes are searched from the font ROM 6 and transferred to the output memory 8h. Further, if the received data is a paper discharge command, image information developed in the output memory 8h is printed out via the output unit 9.

According to the first embodiment, figure data at each step during developing figure pattern is stored, a pattern developing process on the basis of the stored figure data is performed, and the most suitable figure data storage step is selected, thereby it is possible to process the figure data by using a cache memory. As a result, a printing apparatus capable of performing high speed drawing can be provided.

Second Embodiment

Next, a process to generate an outline character pattern is explained in a second embodiment. In the following embodiment, a case where the present invention is applied to an outline character drawing process performed by a printing device, such as a page printer, which outputs binary data, or outputs in black and white is explained. However, the present invention is not limited to the above case, and can be also applied to a printing device which performs multi-value printing or color printing.

Figure 12:
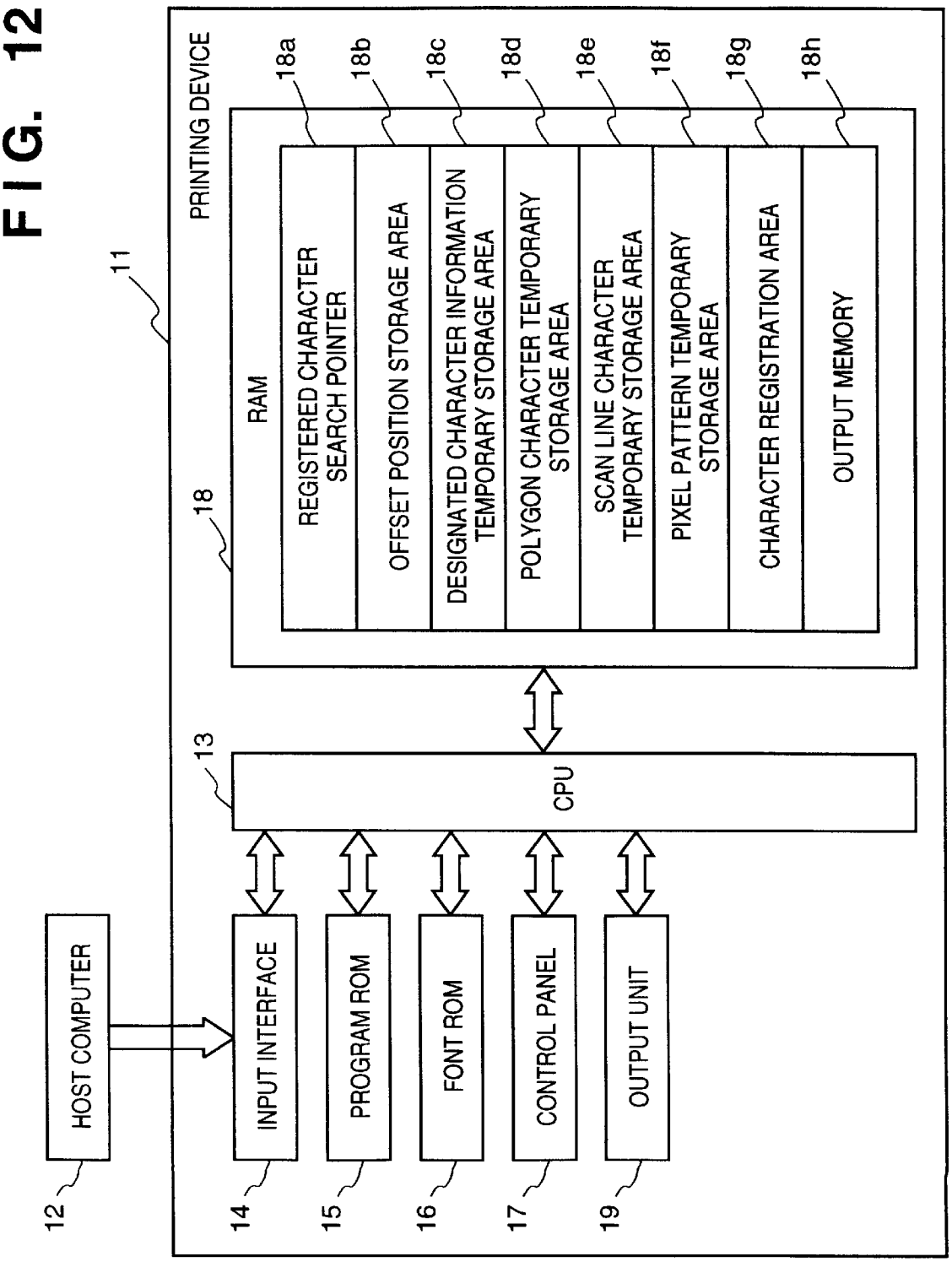
FIG. 12 is a block diagram showing a brief configuration of a printing device according to a second embodiment.

FIG. 12 is a block diagram showing a brief configuration of a printing device according to the second embodiment. In FIG. 12, reference numeral 11 denotes a main body of the printing device; 12, a host computer which can be a data source; 13, CPU which controls the entire operation of the printing device 11; 14, an input interface which includes a buffer for storing data sent from the host computer 12; 15, program ROM which stores programs responsible for operations shown in a flowchart in FIG. 14 and programs for controlling the whole printing device 11; 16, font ROM which stores outline character patterns corresponding to font types and character codes inputted from the input interface 14; and 17, a control panel from which various kinds of setting of the printing device are performed in accordance with instructions by an operator.

Further, reference numeral 18 denotes RAM in which tables, and work area used when the CPU 13 executes various kinds of programs, and the like are defined. The RAM 18 includes a registered character search pointer 18a to be used as a pointer when searching registered characters, an offset position storage area 18b for storing an offset position with respect to a reference position in a character, a designated character information temporary storage area 18c for temporary storing character information indicated by a data source, a point group character temporary storage area 18d for temporary storing the character shape as point group information, a scan line character temporary storage area 18e for temporary storing the character shape as scan line information, a pixel pattern temporary storage area 18f for temporary storing the character shape as pixel pattern information, a character registration area 18g for storing registered characters, and an output memory 18h for storing image patterns to be outputted. Reference numeral 19 is an output unit for printing page data stored in the output memory 18h.

Figure 13:
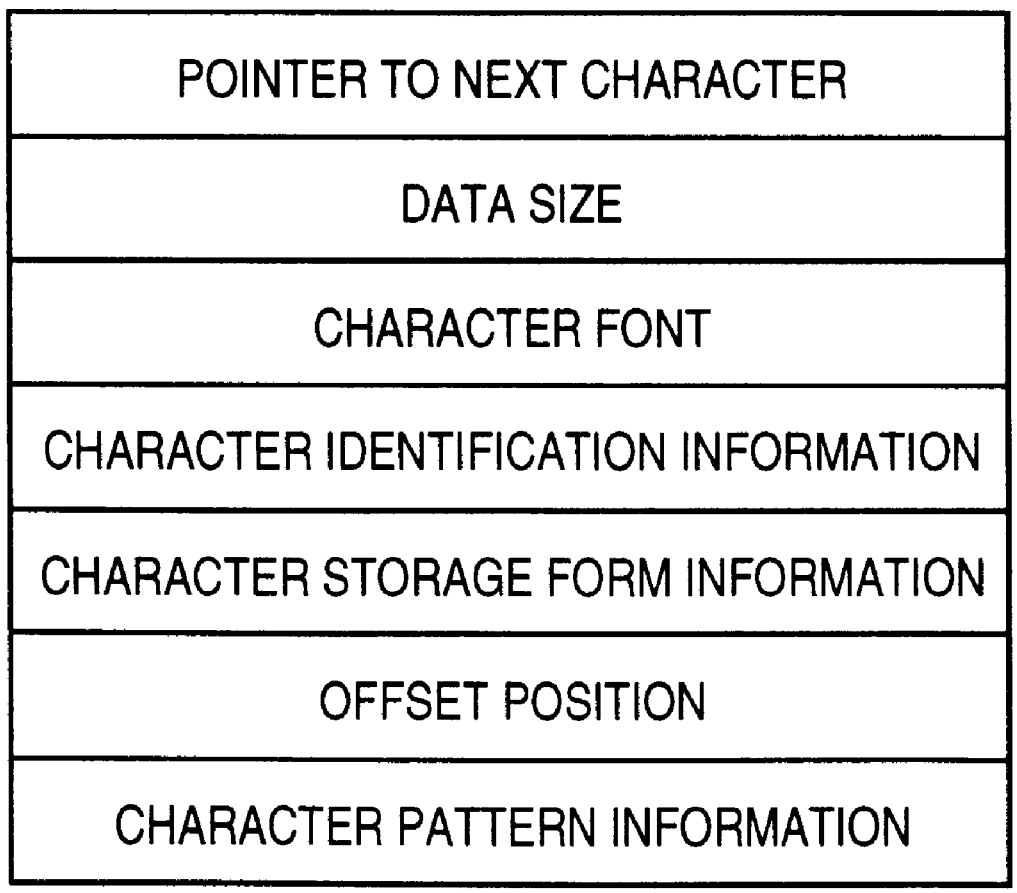
FIG. 13 is a diagram showing data structure of a character storage form according to the second embodiment.

FIG. 13 is a diagram showing a data structure which is to be a base of character storage forms. As shown in FIG. 13, the data is constructed with a pointer 41 which points to the next character for linking a plurality of characters stored in this character storage form, a data size 42 in this character storage form, a character font 43 for showing a font of the character, character identification information 44 for identifying a character based on the size and shape of the character, character storage form information 45 for showing in which form the character is stored, an offset position of the character 46, and character pattern information 47 whose contents are based on the character storage form information 45. Note that NULL in the pointer 41 to the next character indicates the end of the link.

Figure 14:
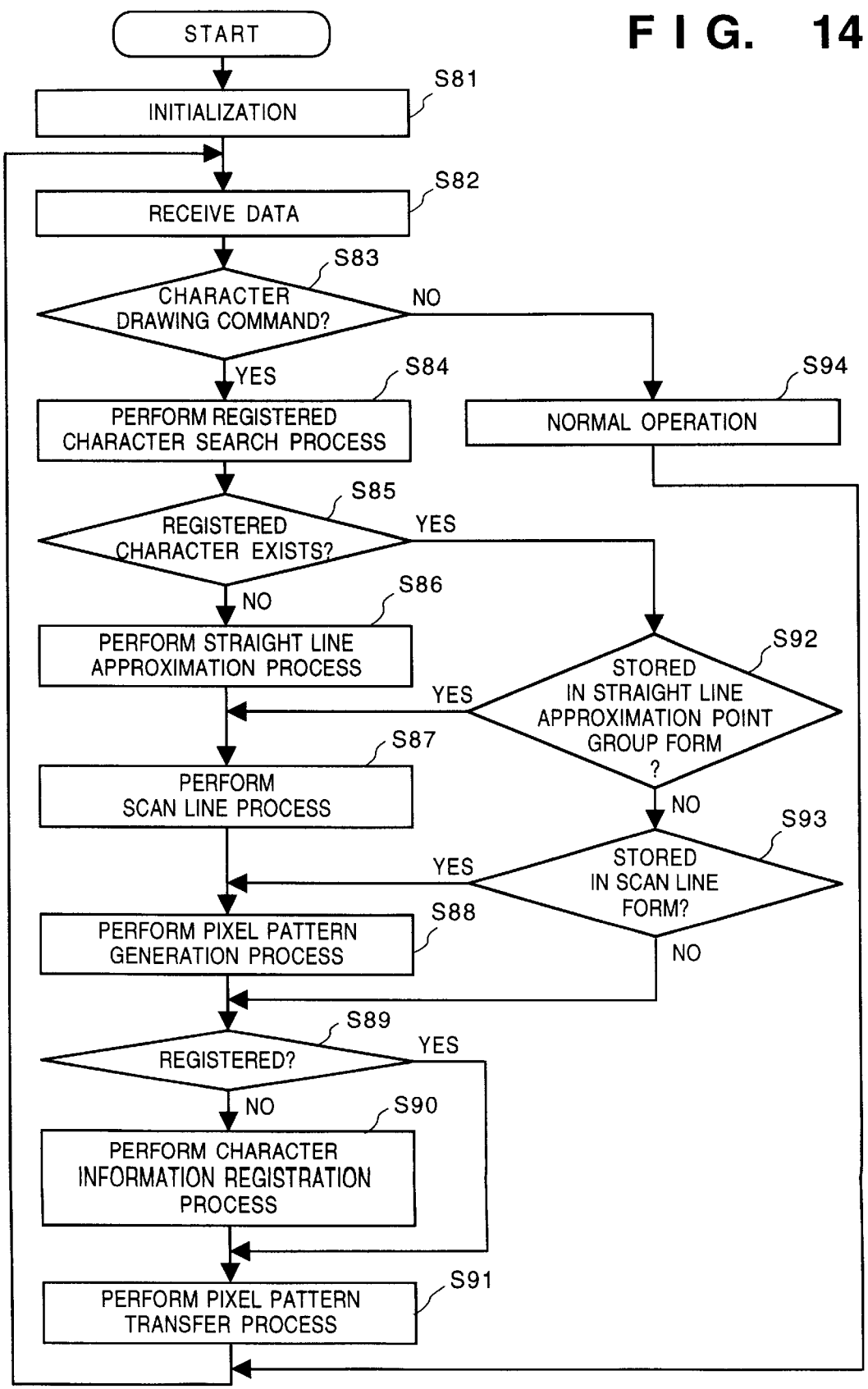
FIG. 14 is a flowchart of an operational sequence according to the second embodiment.

Next, an operation of the aforesaid configuration in the second embodiment will be explained with reference to a flowchart in FIG. 14.

First, when the printing device 11 is powered on, the process proceeds to step S81 where the printing device is initialized, the character registration area 18g is initialized so that no character data is registered there, and the output memory 18h is cleared. Then at step S82, data is received from the input interface 14, and at step S83, whether or not the received data is a character drawing command data is determined. If it is, the process moves to step S84. At step S84, character information, a font type, a character size, a character code, and the like, designated by the command data, are set in the designated character information temporary storage area 18c, and the character designated by the character drawing command data is searched. In this registered character search process, in order to check the registered characters in this character storage form shown in FIG.

13 sequentially, the registered character search pointer 18a is initialized so that it points character data registered in the character registration area 18g. Then it is determined whether or not the font type, such as Mincho and gothic, set in the designated character information temporary storage area 18c matches the font type of the registered character designated by the pointer 18a. If it is determined that the font types match, whether or not the character identification information, such as a character size and a character code, set in the designated character information temporary storage area 18c, matches that of the registered character designated by the pointer 18a is checked. During the repetition of these determination, if a registered character which matches the character designated by the character drawing command data is found, this search process is completed. Whereas, if there is no registered character which matches the character designated by the character drawing command data, namely if the pointer points NULL, the search process is completed.

Next at step S85, whether or not there is a registered character is determined by checking the pointer 18a set by the registered character search process at step S84, namely by checking whether or not the content addressed by the pointer 18a is NULL. If it is not, the process proceeds to step S86 and a straight line approximation process is performed. In this process, an outline character pattern corresponding to the character designated by the character drawing command data is fetched from the outline character patterns stored in the font ROM 16 on the basis of the font type, the character size, and the character code set in the designated character information temporary storage area 18c. Then, character outline coordinates values of the fetched character pattern are multiplied by coefficients obtained in accordance with resolution of the printing device and the character size. The obtained data is decided as a character pattern of a suitable size. Further, curve portions of the character are processed with the straight line approximation in a method as expressed in the straight line approximation routine shown in the FIG. 7 in the first embodiment, and the obtained data is stored in the point group character temporary storage area 18d. Further, an offset position of the character is also obtained by multiplying by the aforesaid coefficients, and stored in the offset position storage area 18b.

Next at step S87, a scan line process is performed. In this process, the point group data set in the point group character temporary storage area 18d is fetched, and the adjacent x and y coordinate points, determined by the straight line approximation process are joined by straight lines to form an approximate figure represented by the input data. The approximate figure is divided by multiple scan lines and the coordinates where the scan lines intersects the straight lines forming the approximate figure are determined. For each scan line (y coordinate is constant), corresponding two x coordinates (one at each intersecting point) are determined. The obtained y coordinate value and the pair of right and left x coordinate values are sorted in the increasing order of the y coordinate values. The y and the two x coordinate values are stored in the scan line character temporary storage area 18e along with the number of triplets. Note that the y coordinate value and the right and left x coordinate values are used as the scan line information in the second embodiment as in the first embodiment, however, the present invention is not limited to this, and the scan line process can be in a run length form or in other value storage form. Further, instead of using scan lines, vertical lines, obtained by interchanging x and y coordinates, can be used as a vertical line process.

Next at step S88, a pixel pattern generation process is performed. In the pixel pattern generation process, the scan line data stored in the scan line character temporary storage area 18e is fetched first, and bits between the right and left x coordinates for each y coordinate are turned on. Then, a pattern obtained after processing the bits is stored in the pixel pattern temporary storage area 18f. Thereafter, at step 89, whether or not the character has already been registered is determined by checking whether or not the content addressed by the registered character search pointer 18a is NULL. If is determined that the character has been registered, the process moves to step S91 which will be explained later. Whereas, if it is determined that the character has not been registered, a character information registration process is performed at step S90.

In the character information registration process, data sizes of the character data stored in the point group character temporary storage area 18d, the scan line character temporary storage area 18e, and the pixel pattern temporary storage area 18f are compared to each other, and storage form having the smallest data size is to be registered. Note that the storage form is based on its data size in the second embodiment as in the first embodiment, however, it can be also based on a size of a character, or the states of available memory space. The character data is registered in the character registration area 18g in the storage form decided at this step. More specifically, a pointer for linking to character data which has been registered is set, and the data size, the character font, the character identification information, the character storage form information, the offset position, and the character pattern information in accordance with the decided character storage form are also set.

Next at step S91, a pixel pattern transfer process is performed. In the this process, a pixel pattern is fetched at first. If the pixel pattern is stored in the character registration area 18g, it is fetched from the area 18g, and if it is stored in the pixel pattern temporary storage area 18f, it is fetched from the area 18f. Then, the fetched pixel pattern is transferred to a drawing position in the output memory 18h. In this transference, the pixel pattern is transferred to a position decided in consideration with the reference position and the offset position of the character, and, if there is any extra process, such as gray scale patterning, hatching, or coloring, is to be applied, it is performed during this transference. Further, the pixel pattern to be drawn to the output memory 18h can be processed with additional logical operations during this transference. When the pixel pattern transfer process at step S91 is completed, the process goes back to the aforesaid step S82.

In contrast, if it is determined at step S85 that a registered character is found, the process moves to step S92 where whether or not the registered character is in the straight line approximation point group form is determined on the basis of the character storage form information. If yes at this step, the process goes to step S87, whereas if no, the process moves to step S93. At step S93, whether or not the registered character is in a scan line form is determined on the basis of the character storage form information. If it is, the process moves to step S88, whereas if it is not, the process moves to step S89.

In the above decision step S83, if the received data is determined that it is not character drawing command data, the process proceeds to step S94 where a normal operation as a printing device is performed, then goes back to step S82. More specifically, if the received data is a figure printing command, then designated figures are developed in the output memory 18h, and if the received data is a paper discharging command, image information developed in the output memory 18h is printed out via the output unit 19.

According to the second embodiment, it is possible to process a character of large size by using a cache memory efficiently. As a result, a printing apparatus capable of performing high speed drawing can be provided.

Third Embodiment

Next, a process to interpolate intervals between successive thick lines, to interpolate the ends of the interpolated line by using shapes of circles, and to draw the line is explained in a third embodiment. It should be noted that a printing device used in the third embodiment is the same as the one in the first embodiment, and the explanation of the apparatus is omitted.

Figure 15:
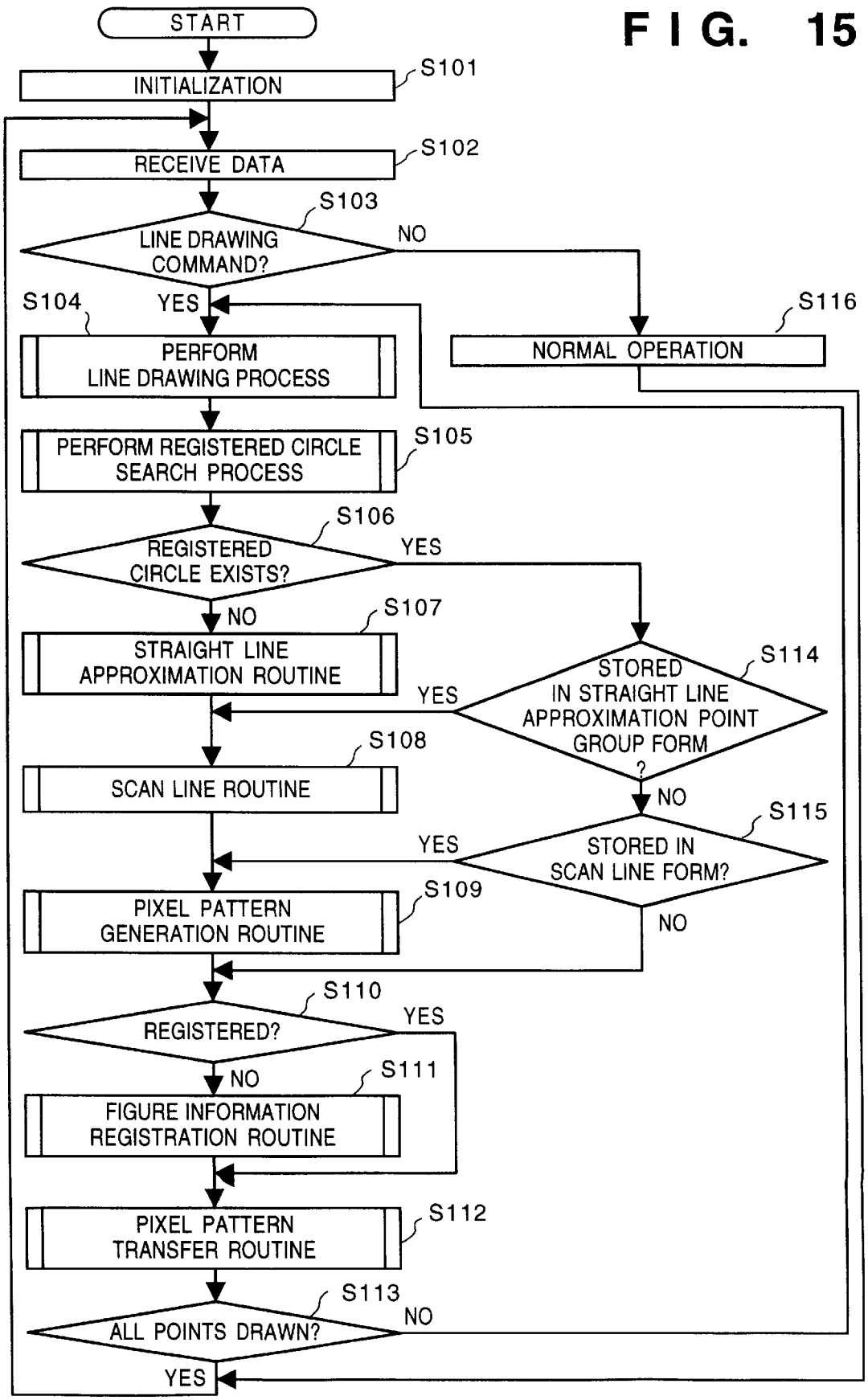
FIG. 15 is a flowchart of an operational sequence according to a third embodiment.

An operation of the third embodiment will be described with reference to a flowchart shown in FIG. 15.

First, when the printing device 1 is powered on, the process proceeds to step S101 where the printing device is initialized, the figure registration area 8g is cleared so that no figure data is registered there, and the output memory 8h is cleared. Then at step S102, data is received from the input interface 4, and at step S103, whether or not the received data is line drawing command data is determined. If it is, the process proceeds to step S104 where shapes of lines (i.e., line thickness, coordinates of points in a point group, and the like) designated by the command and information that the interpolation of intervals between the designated lines and at the end of the interpolated line is performed by using circles are set in the figure shape temporary storage area 8c. Thereafter, coordinate points are fetched and a line having a thickness designated by the command is drawn in the output memory 8h. The line drawing process is performed in such a manner that four points which form a line of designated thickness in correspondence with the start and end points are obtained and an area inside of a rectangle formed by connecting the obtained four points is filled.

Next at step S105, whether or not a circle (a circle whose radius is half thickness of the line), used to interpolate intervals between the lines and the end of the interpolated line designated by the line drawing command data, has been registered is determined in a registered circle search process. In this process, in order to check sequentially the registered circle in this figure storage form shown in FIG. 3, the registered figure search pointer 8a is cleared so that it points figure data registered in the figure registration area 8g. Next, whether or not the type of the figure set in the figure shape temporary storage area 8c is a circle is determined. If it is, whether or not the figure identification information set in the figure shape temporary storage area 8c, namely, if the radius of the circle matches that of figure identification information of the registered figure addressed by the pointer 8a, is determined. During the repetition of these determination, if there is a registered figure which matches the circle set in the designated figure information temporary storage area 8c, this search process is completed. Whereas, if there is no registered figure which matches the circle set in the figure information temporary storage area 8c, namely if the pointer points NULL, the search process is completed.

Figure 7:
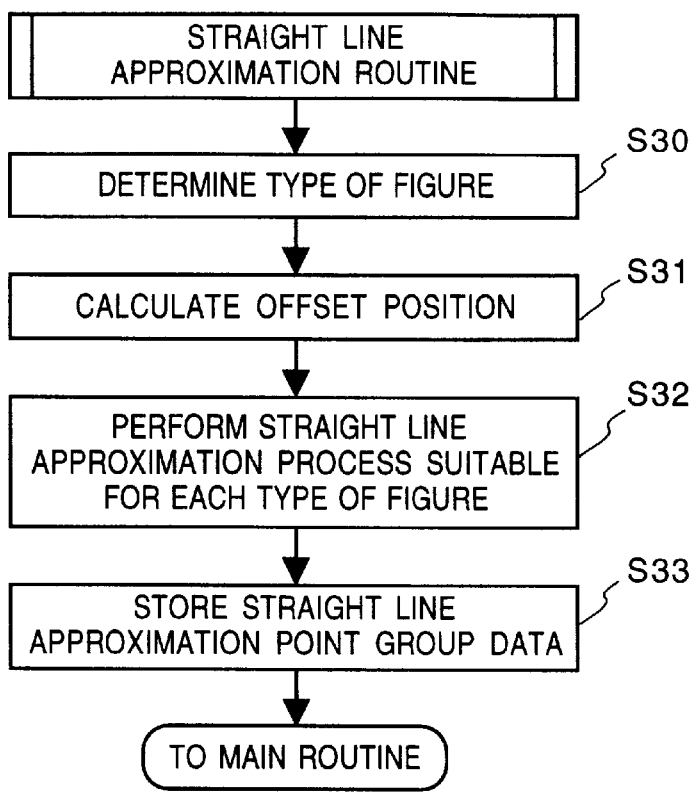
FIG. 7 is a flowchart of a straight line approximation process in FIG. 5.

Next at step S106, whether or not there is a registered circle is determined by checking the pointer 8a, namely by checking whether or not the content addressed by the pointer 8a is NULL. If it is not, the process proceeds to step S107 where the straight line approximation routine shown in the flowchart in FIG. 7 is performed, and to next step S108 where the scan line routine shown in the flowchart in FIG. 8 is performed, further to step S109 where the pixel pattern generation routine shown in the FIG. 10 is performed. Then at step S110, whether or not the figure has already registered is determined by checking whether or not the content addressed by the pointer 8a is NULL. If it is determined in this decision step that the figure has been registered, the process proceeds to step S112. Whereas, if it is determined that the figure has not been registered yet, the figure information registration routine shown in the flowchart in FIG. 10 is performed at step S111 and the pixel pattern transfer routine shown in the flowchart in FIG. 11 is performed at step S112. Next at step S113, whether or not the point group designated by the line drawing command has been drawn is judged. If there is any remaining point, the process goes back to step S104, whereas if all the points have been drawn, the process goes back to step S102.

If it is determined at step S106 that a registered circle is found, the process moves to step S114 where whether or not the registered figure is in the straight line approximation point group form is determined on the basis of the character storage form information. If yes at this step, the process goes to step S108, whereas if no, the process moves to step S115. At step S115, whether or not the registered figure is in the scan line form is determined on the basis of the character storage form information. If it is, the process moves to step S109, whereas if it is not, the process moves to step S110.

In the above decision step S103, if the received data is determined that it is not line drawing command data, the process proceeds to step S116 where a normal operation as a printing device is performed, then goes back to step S102. More specifically, if the received data is a character printing command, then characters of designated character codes are searched from the font ROM 6 and developed in the output memory 8h, and if the received data is a paper discharging command, image information developed in the output memory 8h is printed out via the output unit 9.

The present invention can be applied to a system constituted by a plurality of devices, or to an apparatus comprising a single device. Furthermore, the invention is applicable also to a case where the object of the invention is attained by supplying a program to a system or apparatus.

According to the embodiments as described above, it is possible to process not only a character but also a figure pattern by using a cache memory efficiently. As a result, a printing apparatus capable of performing high speed drawing can be provided.

The present invention is not limited to the above embodiments and various changes and modifications can be made within the spirit and scope of the present invention. Therefore to appraise the public of the scope of the present invention, the following claims are made.

What is claimed is:

1. A figure processing apparatus, comprising:
   point group calculating means for calculating point group information based on figure data;
   pixel pattern generating means for generating pixel pattern information based on the point group information calculated by said point group calculating means;
   selecting means for selecting one of the point group information calculated by said point group calculating means and the pixel pattern information generated by said pixel pattern generating means in accordance with a comparison therebetween;
   cache memory storing means for storing, in a cache memory, the one of the point group information calculated by said point group calculating means and the pixel pattern information generated by said pixel pattern generating means selected by said selecting means;

determining means for determining whether or not first point group information based on first figure data to be outputted or first pixel pattern information based on the first figure data to be outputted are stored in the cache memory; and transferring means for transferring pixel pattern information to an output memory in accordance with a determination by said determining means, said transferring means transferring to the output memory the first pixel pattern information stored in the cache memory in a case where the first pixel pattern information is stored in the cache memory, said transferring means transferring to the output memory pixel pattern information generated by said pixel pattern generating means from the first point group information in a case where the first point group information is stored in the cache memory, and said transferring means transferring to the output memory pixel pattern information generated by said pixel pattern generating means from point group information calculated by said point group calculating means based on the first figure data in a case where neither the first pixel pattern information nor the first point group information are stored in the cache memory.

2. The apparatus according to claim 1, wherein respective data sizes of point group information calculated by said point group calculating means and pixel pattern information generated by said pixel pattern generating means are compared by said selecting means, and the information having a smallest data size is stored in the cache memory by said cache memory storing means.

3. The apparatus according to claim 1, wherein point group information calculated by said point group calculating means and pixel pattern information generated by said pixel pattern generating means are stored in the cache memory in accordance with a comparison by said selecting means based on a physical size of a generated figure.

4. The apparatus according to claim 1, wherein point group information calculated by said point group calculating means and pixel pattern information generated by said pixel pattern generating means are stored in the cache memory in accordance with a comparison by said selecting means based on available memory space.

5. The apparatus according to claim 1, further comprising output means for outputting a pixel pattern based on the pixel pattern information transferred to the output memory.

6. The apparatus according to claim 5, wherein said output means is a printer.

7. The apparatus according to claim 1, further comprising input means for inputting the figure data.

8. The apparatus according to claim 1, wherein the figure data includes character data.

9. The apparatus according to claim 1, wherein the figure data includes a circle.

10. The apparatus according to claim 1, wherein the point group information is straight line approximated coordinate information.

11. An output apparatus, comprising:

point group generating means for generating point group data based on figure data;

pixel pattern generating means for generating pixel pattern data based on the point group data generated by said point group generating means;

selecting means for selecting one of the point group data calculated by said point group generating means and the pixel pattern data generated by said pixel pattern generating means in accordance with a comparison therebetween;

cache memory storing means for storing, in a cache memory, the one of the point group data generated by said point group generating means and the pixel pattern data generated by said pixel pattern generating means selected by said selecting means;

determining means for determining whether or not first point group data corresponding to a first figure data to he outputted or first pixel pattern data corresponding to the first figure data to be outputted are stored in the cache memory; and output means for outputting pixel pattern data in accordance with a determination by said determining means, said output means outputting the first pixel pattern data stored in the cache memory in a case where the first pixel pattern data is stored in the cache memory, said output means outputting pixel pattern data generated by said pixel pattern generating means from the first point group data in a case where the first point group data is stored in the cache memory, and said output means outputting pixel pattern data generated by said pixel pattern generating means from point group data generated by said point group generating means based on the first figure data in a case where neither the first pixel pattern data nor the first point group data are stored in the cache memory.

12. The apparatus according to claim 11, wherein the point group data is straight line approximated coordinate information.

13. The apparatus according to claim 11, wherein said output means is a printer.

14. A figure processing method, comprising the steps of:

calculating point group information based on figure data;

generating pixel pattern information based on the calculated point group information;

selecting one of the calculated point group information and the generated pixel pattern information in accordance with a comparison therebetween;

storing, in a cache memory, the one of the calculated point group information and the generated pixel pattern information selected in said selecting step;

determining whether or not first point group information based on first figure data to be outputted or first pixel pattern information based on the first figure data to be outputted are stored in the cache memory; and transferring pixel pattern information to an output memory in accordance with a determination of said determining step, wherein in a case where the first pixel pattern information is stored in the cache memory, the first pixel pattern information stored in the cache memory is transferred to the output memory, in a case where the first point group information is stored in the cache memory, pixel pattern information generated from the first point group information is transferred to the output memory, and in a case where neither the first pixel pattern information nor the first point group information are stored in the cache memory, pixel pattern information generated from point group information calculated based on the first figure data is transferred to the output memory.

15. The method according to claim 14, wherein data sizes of the calculated point group information and the generated pixel pattern information are compared in said selecting step, and the information having a smallest size is stored in the cache memory in said storing step.

16. The method according to claim 14, wherein the calculated pixel group information and the generated pixel pattern information are stored in the cache memory in accordance with a comparison in said selecting step based on a physical size of a generated figure.

17. The method according to claim 14, wherein the calculated point group information and the generated pixel pattern information are stored in the cache memory in accordance with a comparison in said selecting step based on available memory space.

18. The method according to claim 14, further comprising the step of outputting a pixel pattern to an output device based on the pixel pattern information transferred to the output memory.

19. The method according to claim 18, wherein said output device is a printer.

20. The method according to claim 14, further comprising the step of inputting the figure data.

21. The method according to claim 14, wherein the figure data includes character data.

22. The method according to claim 14, wherein the figure data includes a circle.

23. The method according to claim 14, wherein the point group information is straight line approximated coordinate information.

24. An output method, comprising the step of:
generating point group data based on figure data;
generating pixel pattern data based on the point group data;
selecting one of the generated point group data and the generated pixel pattern data in accordance with a comparison therebetween;
storing, in a cache memory, the one of the generated point group data and the generated pixel pattern data selected in said selecting step;
determining whether or not first point group data corresponding to a first figure data to be outputted or first pixel pattern data corresponding to the first figure data to be outputted are stored in the cache memory; and
outputting pixel pattern data in accordance with a determination of said determining step,
wherein in a case where the first pixel pattern data is stored in the cache memory, the first pixel pattern data stored in the cache memory is outputted to the output memory, in a case where the first point group data is stored in the cache memory, pixel pattern data generated from the first point group data is outputted to the output memory, and in a case where neither the first pixel pattern data nor the first point group data are stored in the cache memory, pixel pattern data generated from point group data generated based on the first figure data is outputted to the output memory.

25. The method according to claim 24, wherein the point group data is straight line approximated coordinate information.

26. The method according to claim 24, wherein said outputting step outputs to a printer.

27. A computer program product for figure processing, the product comprising a computer-usable medium having computer-readable program code means embodied in said medium, said product comprising:
code means to calculate point group information based on figure data;
code means to generate pixel pattern information based on the calculated point group information;
code means to select one of the calculated point group information and the generated pixel pattern information in accordance with a comparison therebetween;
code means to store, in a cache memory, the one of the calculated point group information and the generated pixel pattern information selected by said selecting code means;
code means to determine whether or not first point group information based on first figure data to be outputted or first pixel pattern information based on the first figure data to be outputted are stored in the cache memory; and
code means to transfer pixel pattern information to an output memory in accordance with a determination by said determining code means,
wherein in a case where the first pixel pattern information is stored in the cache memory, the first pixel pattern information stored in the cache memory is transferred to the output memory, in a case where the first point group information is stored in the cache memory, pixel pattern information generated from the first point group information is transferred to the output memory, and in a case where neither the first pixel pattern information nor the first point group information are stored in the cache memory, pixel pattern information generated from point group information calculated based on the first figure data is transferred to the output memory.

28. The computer program product according to claim 9, wherein the point group information is straight line approximated coordinate information.

29. A computer program product for outputting, the product comprising a computer-usable medium having computer-readable program code mean embodied in said medium, said product comprising:
code means to generate point group data based on figure data;
code means to generate pixel pattern data based on the point group data;
code means to select one of the generated point group data and the generated pixel pattern data in accordance a comparison therebetween;
code means to store, in a cache memory, the one of the generated point group data and the generated pixel pattern data selected by said selecting code means;
code means to determine whether or not first point group data corresponding to a first figure data to be outputted or first pixel pattern data corresponding to the first figure data to be outputted is stored in the cache memory; and
code means to output pixel pattern data in accordance with a determination by said determining code means,
wherein in a case where the first pixel pattern data is stored in the cache memory, the first pixel pattern data stored in the cache memory is outputted to the output memory, in a case where the first point group data is stored in the cache memory, pixel pattern data generated from the first point group data is outputted to the output memory, and in a case where neither the first pixel pattern data nor the first point group data are stored in the cache memory, pixel pattern data generated from point group data generated based on the first figure data is outputted to the output memory.

30. The computer program product according to claim 29, wherein the point group is straight line approximated coordinate information.

31. A figure processing apparatus, comprising:

point group calculating means for calculating point group information based on figure data;

scan line generating means for generating scan line information based on the point group information calculated by said point group calculating means;

pixel pattern generating means for generating pixel pattern information based on the scan line information generated by said scan line generating means;

selecting means for selecting one of the point group information calculated by said point group calculating means, the scan line information generated by said scan line generating means, and the pixel pattern information generated by said pixel pattern generating means in accordance with a comparison therebetween;

cache memory storing means for storing, in a cache memory, the one of the point group information calculated by said point group calculating means, the scan line information generated by said scan line generating means, and the pixel pattern information generated by said pixel pattern generating means selected by said selecting means;

determining means for determining whether or not first point group information based on a first figure data to be outputted, first scan line information based on the first figure data to be outputted, or first pixel pattern information based on the first figure data to be outputted are stored in the cache memory; and transferring means for transferring pixel pattern information to an output memory in accordance with a determination by said determining means, said transferring means transferring to the output memory the first pixel pattern information stored in the cache memory in a case where the first pixel pattern information is stored in the cache memory, said transferring means transferring to the output memory pixel pattern information generated by said pixel pattern generating means from the first scan line information in a case where the first scan line information is stored in the cache memory, said transferring means transferring to the output memory pixel pattern information generated by said pixel pattern generating means from scan line information generated by said scan line generating means from the first point group information in a case where the first point group information is stored in the cache memory, and said transferring means transferring to the output memory pixel pattern information generated by said pixel pattern generating means from scan line information generated by said scan line generating means from point group information calculated by said point group calculating means based on the first figure data in a case where none of the first pixel pattern information, the first scan line information, and the first point group information is stored in the cache memory.

32. The apparatus according to claim 31, wherein the point group information is straight line approximated coordinate information.

33. The apparatus according to claim 31, wherein the scan line information comprises start and end coordinates.

34. A figure processing apparatus, comprising:

scan line generating means for generating scan line information based on figure data;

pixel pattern generating means for generating pixel pattern information based on the scan line information generated by said scan line generating means;

selecting means for selecting one of the scan line information generated by said scan line generating means and the pixel pattern information generated by said pixel pattern generating means in accordance with a comparison therebetween;

cache memory storing means for storing, in a cache memory, the one of the scan line information generated by said scan line generating means and the pixel pattern information generated by said pixel pattern generating means selected by said selecting means;

determining means for determining whether or not first scan line information based on first figure data to be outputted or first pixel pattern information based on the first figure data to be outputted are stored in the cache memory; and transferring means for transferring pixel pattern information to an output memory in accordance with a determination by said determining means, said transferring means transferring to the output memory the first pixel pattern information stored in the cache memory in a case where the first pixel pattern information is stored in the cache memory, said transferring means transferring to the output memory pixel pattern information generated by said pixel pattern generating means from the first scan line information in a case where the first scan line information is stored in the cache memory, and said transferring means transferring to the output memory pixel pattern information generated by said pixel pattern generating means from scan line information generated by said scan line generating means based on the first figure data in a case where neither the first pixel pattern information nor the first scan line information are stored in the cache memory.

35. The apparatus according to claim 34, wherein the scan line information comprises start and end coordinates.

* * * * *

UNITED STATES PATENT AND TRADEMARK OFFICE
CERTIFICATE OF CORRECTION

PATENT NO. : 5,963,655

DATED : October 5, 1999

INVENTOR : Masakatsu Sakurai

It is certified that error appears in the above-identified patent and that said Letters Patent is hereby corrected as shown below:

COLUMN 2

Line 50, "embodiment" should read --embodiments--.

COLUMN 6

Line 8, "intersects" should read --intersect--.

COLUMN 9

Line 12, "determination," should read --determinations,--;
   Line 32, "coordinates" should read --coordinate--; and
   Line 51, "intersects" should read --intersect--.

COLUMN 10

Line 10, "is" should read --it is--.

COLUMN 11

Line 53, "determination," should read --determinations,--.

UNITED STATES PATENT AND TRADEMARK OFFICE
CERTIFICATE OF CORRECTION

PATENT NO. : 5,963,655
DATED : October 5, 1999
INVENTOR : Masakatsu Sakurai

It is certified that error appears in the above-identified patent and that said Letters Patent is hereby corrected as shown below:

COLUMN 12

Line 3, "registered" should read --been registered--.

COLUMN 14

Line 11, "he" should read --be--.

COLUMN 16

Line 28, "Claim 9," should read --Claim 27,--; and
Line 33, "mean" should read --means--.

Signed and Sealed this

Eleventh Day of July, 2000

Attest:

Q. TODD DICKINSON

Attesting Officer       Director of Patents and Trademarks